United States Patent Office 3,050,729
Patented Aug. 21, 1962

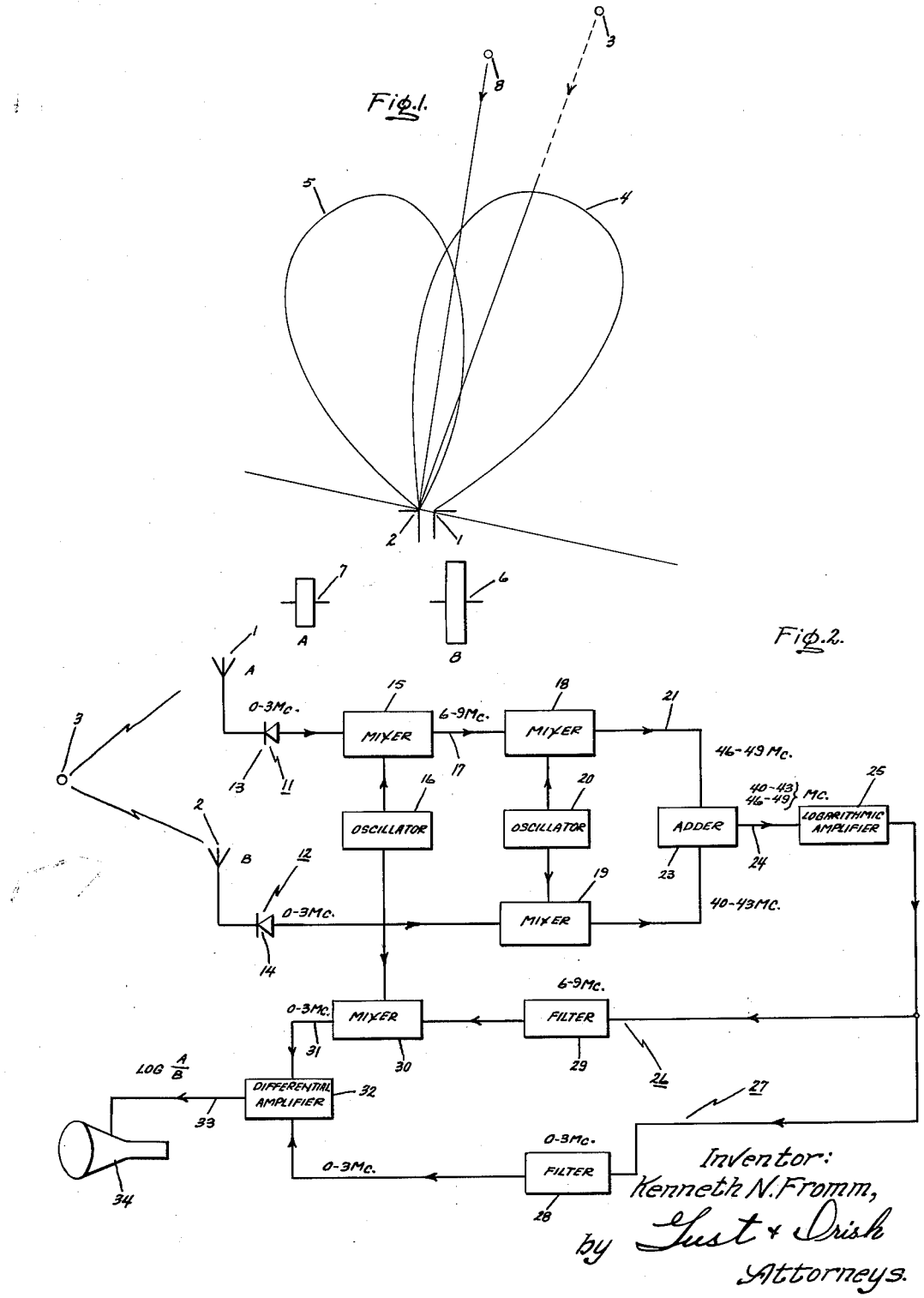

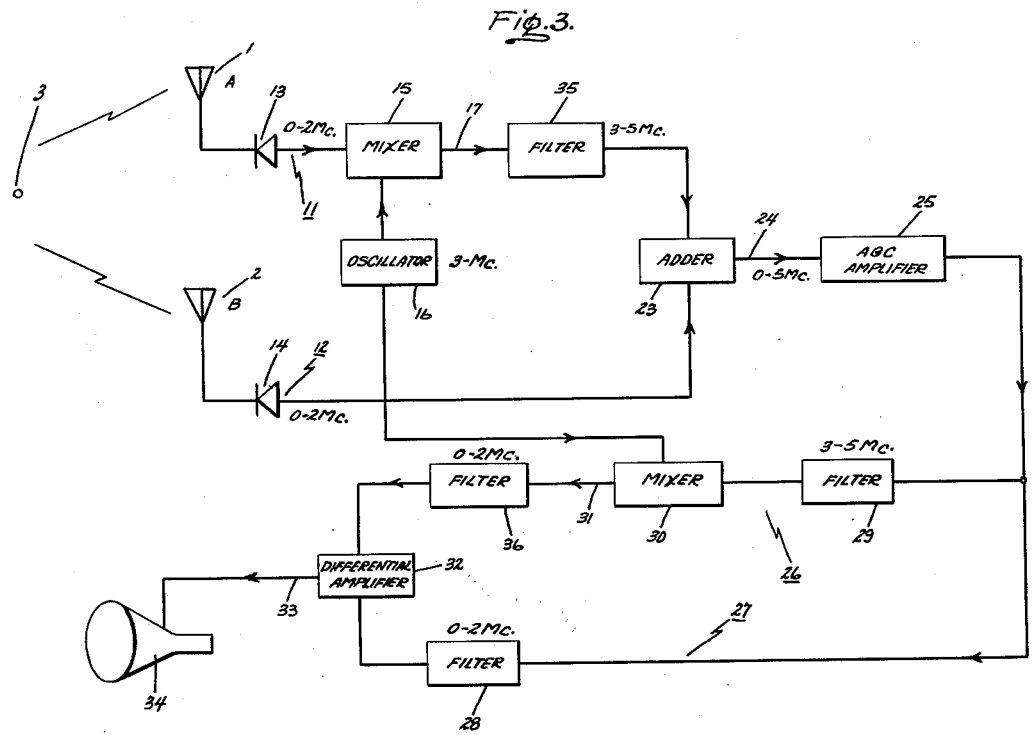

3,050,729
RADIO DIRECTION FINDING SYSTEM
Kenneth Norman Fromm, Cincinnati, Ohio, assignor to International Telephone and Telegraph Corporation
Filed June 17, 1958, Ser. No. 744,036
5 Claims. (Cl. 343—119)

This invention relates to radio direction finding systems, and more particularly to a radio direction finding system providing directional information independent of the strength of the signals received from the distant source.

In certain radio direction finding systems employed in the location of a distant source of radio signals, it is desirable to provide a cathode ray tube deflection proportional to the angle which the direction to the signal source forms with a reference "forward" direction. This angle is found by comparing the signals received from the source in two antennas which look into different directions. It is further desirable that this angle be ascertained independently of the distance of the receiving apparatus from the signal source and thus the signal strength; it will be seen that a weak received signal from a distant source at a small angle may provide the same antenna output signal as a strong received signal from a closer source at a greater angle. A signal giving directional information independent of power input has in prior systems been obtained by performing electronically the mathematical operation $$\frac{(A-B)}{(A+B)}$$

where A is the signal output of one of the antennas and B is the signal output of the other antenna. An alternative solution to the problem of providing the required directional information independent of the power input has been with the use of logarithmic amplifiers providing a function $$\text{Log } A - \log B \left( = \log \frac{A}{B} \right)$$

It is thus seen that with each of the prior arrangements, a ratio of the amplitudes of the signals respectively received by the two antennas is provided, this ratio being proportional to the angle between the two received signals independent of the actual signal strength.

In the above-described prior systems for obtaining a ratio of two received signals, two amplifiers were employed for the A and B channels. The disadvantage of such systems, however, was the requirement that the two amplifiers track to within a fraction of a db over the dynamic range of the amplifiers in order to obtain accurate directional information, i.e., the amplifiers were required to have substantially identical response characteristics. This requirement is, however, difficult to obtain in practice, particularly with logarithmic amplifiers, and it is therefore desirable to provide a radio direction finding system of the type here under discussion in which a single amplifier may be employed for both input signals.

In accordance with the broader aspects of my invention, therefore, I provide a radio direction finding system having two input circuits for respectively receiving a radio signal from a distant source and for providing two input signals in response thereto. One of these input signals is shifted in frequency with respect to the other input signal, the two signals are then added in an adding circuit and passed through a single amplifier which may be either a logarithmic amplifier or an automatic gain control amplifier approximating a logarithmic compression. Means are then provided for separating the two signals which were simultaneously passed through the amplifier, the two signals then being differentially combined thereby providing an output signal representing the ratio of the two signals.

It is therefore an object of my invention to provide an improved radio direction finding system.

Another object of my invention is to provide an improved radio direction finding system in which two input signals from separate antennas are passed through a single amplifier.

A further object of my invention is to provide an improved radio direction finding system in which one of two signals from separate antennas has an electrical parameter changed with respect to the other signal with both signals being passed through a single amplifier.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 diagrammatically illustrates two antennas, as employed in a radio direction finding system, with their respective response characteristic loops and having signals being received by the two antennas from a remote signal source;

FIG. 2 is a schematic illustration of one embodiment of my invention; and

FIG. 3 is a schematic illustration showing a modified form of the embodiment of FIG. 1.

Referring now to FIG. 1, there is shown two antennas 1 and 2 respectively arranged for receiving signals from a distant source 3 of radio signals, which may be relatively short spaced apart radio frequency pulses. The two antennas 1 and 2 respectively have response loops 4 and 5, as shown, and the signal pulses respectively received by the antennas 1 and 2 from the remote signal source 3 are designated here as A and B, as shown. It will be understood that the antennas 1 and 2 are schematically shown and may in practice respectively be a pair of arrays, horns, etc. It will now be seen that the signal pulses A received by the antenna 1 from the distant signal source 3 will provide an output pulse 6 having a substantially greater amplitude than the output pulse 7 provided by antenna 2 responsive to the received signal pulses B. It would be thought that mere ascertainment of the respective amplitudes of the input pulses 6 and 7 would provide the requisite information for determining the angular direction of the distant signal source 3, however, inspection of FIG. 1 will readily indicate that a weak signal source 8 relatively close to the two antennas, but almost straight ahead, will provide strong output signals from both antennas, and therefore a sizeable difference in the two signal strengths, whereas the signals from a more distant source 3 are weak, and thus so is their difference, even though 3 may be at a considerable angle off. It will, however, be seen that the ratio between the received signals A and B will remain constant regardless of the strength of the signal source.

Referring now to FIG. 2, one embodiment of my improved radio direction finding system, generally identified as 10, includes the antennas 1 and 2 for respectively receiving radio signals A and B from a common distant source 3, antennas 1 and 2 being respectively connected to input circuits 11 and 12. In this embodiment, detectors 13 and 14, which may be of any conventional form, are respectively connected in the input circuits 11 and 12 as shown. A mixer circuit 15 is provided having its signal input circuit connected to detector 13 and having its carrier input circuit connected to local oscillator 16. Mixer circuit 15 may be of any conventional form and is arranged to pass only the lower side band frequencies of its output signal in its output circuit 17; a conventional balanced modulator which suppresses the carrier in its output with either side band frequency being obtainable is well suited for use as the mixer 15. Assuming therefore that the signals received by the antennas 1 and 2 from the distant source 3, after rectification in the two input circuits 11 and 12, have a frequency band from zero to three megacycles and that the local oscillator 16 provides a carrier frequency of nine megacycles, it will be seen that the frequency band provided in the output circuit 17 of the mixer 15 will be from six to nine megacycles.

Since it may be found desirable still further to increase the frequency of the signals in the output circuit 17 of mixer 15 and in the input circuit 12, mixers 18 and 19 are provided respectively having their input circuits connected to output circuit 17 of mixer 15 and to detector 14, and having their carrier input circuits connected respectively to local oscillator 20. Here, mixers 18 and 19 are arranged to pass the upper side band frequencies in their output signal and thus conventional balanced modulators are well suited for use as the mixers 18 and 19. Thus, assuming that local oscillator 20 provides a carrier frequency of forty megacycles, it will be seen that mixer 18 will pass a frequency band of from forty-six to forty-nine megacycles in its output circuit 21 and that mixer 19 will pass a frequency band of from forty to forty-three megacycles in its output circuit 22. A conventional adding circuit 23 is provided having its input circuits connected respectively to output circuits 21 and 22 of mixers 18 and 19, and having its output circuit 24 connected to the input circuit of a suitable amplifier 25, which may be a logarithmic amplifier. Since the adding circuit 23 merely adds the signals appearing in the output circuits 21 and 22 of mixers 18 and 19, it will be seen that a signal appearing in the output circuit 24 of the adding circuit 23 will contain frequency components from forty to forty-three megacycles and from forty-six to forty-nine megacycles, this single signal containing these two frequency band components being readily passed through the amplifier 25.

In order to separate out the intelligence contained in the single signal passed through the amplifier 25, two signal separating circuits 26 and 27 are provided. Amplifier 25 is an intermediate frequency amplifier, preferably logarithmic, which contains demodulating means (a second detector) so that its output contains the frequencies which were contained in the modulation of the 40 mc. carrier frequency, that is, frequencies from 0 to 3 and from 6 to 0 megacycles. A conventional band-pass filter 28 is connected in the signal separating circuit 27 and is tuned to pass the frequency band from zero to three megacycles. It will be seen that the frequency band from zero to three megacycles is derived from the zero to three megacycle signal in the input circuit 12. Thus, the output signal from the filter 28 has a frequency band from zero to three megacycles and contains the same intelligence information as is contained in the input signal in the input circuit 12. Another band-pass filter 29, which may also be of conventional form, is provided in the signal separating circuit 26 and is arranged to pass the frequency band from six to nine megacycles; it will be seen that the six to nine megacycle band components have been derived from the input circuit 11. Another mixing circuit 30 is provided having its signal input circuit connected to the output circuit of the band-pass filter 29 and having its carrier input circuit connected to the local oscillator 16. Mixer 30 is arranged to pass the lower side-band frequency and it is thus seen that with the local oscillator 16 providing a carrier frequency of nine megacycles and with a frequency band from six to nine megacycles being impressed upon the signal input circuit of mixer 30, the lower side band signal in its output circuit 31 will have a frequency from zero to three megacycles and will contain the intelligence information contained in the zero to three megacycle input signal in the input circuit 11.

A conventional differential amplifier 32 is provided having its input circuits connected respectively to the output circuit 31 of mixer 30 and to the band-pass filter 28, and having its output circuit 33 connected to the deflection means of a suitable cathode ray oscilloscope 34. It will now be seen that the differential amplifier 32 provides in its output circuit 33 a resulting signal which is the difference of the signals in the output circuit 31 of mixer 30 and in the output circuit of the filter 28. Thus, if the amplifier 25 is a logarithmic amplifier, and since $$\text{Log } A - \log B = \log \frac{A}{B}$$

it will be seen that the output signal applied to the deflection means of the cathode ray oscilloscope 34 represents the ratio of the received signals A and B, the received signals having been respectively frequency shifted and passed through a single logarithmic amplifier 25 so that the tracking problems previously encountered in radio direction finding systems employing separate amplifiers for each channel are eliminated.

Referring now to FIG. 3 in which like elements are indicated by like reference numerals, the intermediate frequency mixers 18 and 19 and local oscillator 20 have been eliminated, separate filters in the output circuits of the mixers 15 and 30 are provided, as would be required if balanced modulators are not employed, and amplifier 25 is shown as being an automatic gain control amplifier rather than a logarithmic amplifier. Here, assuming that a signal from the distant source 3 has a frequency range from zero to two megacycles and that the local oscillator 16 provides a carrier frequency of three megacycles, it will be seen that band-pass filter 35 connected between the output circuit 16 of mixer 15 and the input circuit of adder 23 may be tuned to pass a frequency band from three to five megacycles, which is the upper side band frequency in the output signal of the mixer 15. It will thus be seen that the signal appearing in the output circuit 24 of the adding circuit 23 will have a frequency band from zero to five megacycles which is passed through the automatic gain control amplifier 25, which may be arranged to provide a compression approximating a logarithmic compression. Band-pass filter 28 in the signal separating circuit 27 is thus tuned to pass a frequency band from zero to two megacycles while band-pass filter 29 in the signal separating circuit 26 is tuned to pass the frequency band from three to five megacycles. With mixer 30 being of the conventional type rather than of the balanced modulator type, band-pass filter 36 is provided connected to the output circuit 31 of the mixer 30 and tuned to pass the frequency band from zero to two megacycles which is the lower side band frequency in the output signal of the mixer 30. Again, the zero to two megacycle signals provided by the signal separating circuits 26 and 27 which respectively contain the same intelligence information as the signal input circuits 11 and 12, but which have been passed through the single amplifier 25, are impressed upon the input circuits of the differential amplifier 25 which in turn has its output circuit 33 connected to the deflection means of cathode ray oscilloscope 34.

It will be readily understood that two identical circuits of the type shown in FIG. 2 or 3 may be provided with their input circuits respectively connected to four antennas to receive four input signals, two of the antennas being arranged in one plane and the other two being arranged in a plane at right angles thereto. The output circuits 33 of the two differential amplifiers 32 may then be connected to the vertical and horizontal deflection means of the cathode ray oscilloscope 34 thereby to provide quadrature information concerning the distant source of signals.

It will now be seen that I have provided an improved radio direction finding system of the type providing an output signal representing the ratio of the input signals thereby providing directional information independent of power input, one of the input signals having an electrical parameter, i.e., frequency, changed so that the signals can be added and passed through a single amplifier, the amplified signal then being separated into its two components which were respectively derived from the two input signals thereby eliminating the problems encountered in previous direction finding systems of this type with regard to non-uniform tracking of amplifiers in two or more channels.

While I have described above the principles of my invention in connection with specific apparatus, it is to be clearly understood that this description is made only by way of example and not as a limitation to the scope of my invention.

What is claimed is:

1. A radio direction finding system for determining the location of a source of pulsed radio signals comprising: first and second input circuits including detector means for respectively receiving a pulsed radio signal from a distant source and for respectively providing first and second detected input pulses having a first frequency band; means coupled in said first input circuit for shifting said first input pulse to a different frequency band; means coupled to said input circuits for adding the pulses therein; amplifying means coupled to said adding means to provide an output from said amplifying means indicative of the ratio of said first and second input signals, first means coupled to said amplifying means for passing a pulse having said first frequency band; second means coupled to said amplifying means for passing a pulse having the same frequency band as said different frequency band; third means coupled to said second means for demodulating the pulse therein to said first frequency band; and means coupled to said first means and said third means for differentially combining the pulses provided thereby.

2. A radio direction finding system for determining the location of a source of pulsed radio signals comprising: first and second input circuits including detector means for respectively receiving a pulsed radio signal from a distant source and for respectively providing first and second detected input pulses having a first frequency band; first signal mixing means coupled to said first input circuit and having first carrier generating local oscillator means coupled thereto, said first signal mixing means being arranged to modulate said carrier by said first input pulse thereby to shift said first input pulse to a second frequency band higher than said first frequency band; second and third signal mixing means coupled respectively to said first signal mixing means and said second input circuit and having second carrier generating local oscillator means coupled thereto, said second and third signal mixing means being respectively arranged to modulate said second carrier by said input and shifted pulses thereby to shift the same to third and fourth frequency bands higher than said second frequency band; means coupled to said second and third signal mixing means for adding the pulses respectively provided thereby to provide a pulse including both said third and fourth frequency bands; amplifying means coupled to said adding means for amplifying the pulse passed thereby; first band-pass filter means coupled to said amplifying means and arranged to pass a pulse having said first frequency band; second band-pass filter means coupled to said amplifying means and arranged to pass a pulse having said second frequency band; fourth signal mixing means coupled to said second band-pass filter means and to said first local oscillator means and arranged to demodulate the pulse passed by said second band-pass filter means thereby shifting the same to said first frequency band; and means coupled to said first band-pass filter means and to said fourth signal mixing means for differentially combining the pulses passed thereby.

3. A radio direction finding system for determining the location of a source of pulsed radio signals comprising: first and second input circuits including detector means for respectively receiving a pulsed radio signal from a distant source and for respectively providing first and second detected input pulses having a first frequency band; means coupled in said first input circuit for shifting said first input signal to a different frequency band; means coupled to said input circuits for adding said second input and shifted pulses to provide a pulse including both said first and different frequency bands; logarithmic amplifying means coupled to said adding means for amplifying the pulses passed thereby; first band-pass filter means coupled to said logarithmic amplifying means and arranged to pass a pulse having said first frequency band; second band-pass filter means coupled to said logarithmic amplifying means and arranged to pass a pulse having said different frequency band; means coupled to said second band-pass means for demodulating the signal passed thereby to said first frequency band; and means coupled to said first band-pass filter means and to said last-named converting means for differentially combining the pulses passed thereby.

4. A radio direction finding system for determining the location of a source of pulsed radio signals comprising: first and second input circuits including detector means for respectively receiving a pulsed radio signal from a distant source and for respectively providing first and second detected input pulses having a first frequency band; means coupled in said first input circuit for shifting said first input pulse to a different frequency band; means coupled to said input circuits for adding said second input and shifted pulses to provide a pulse including both said first and different frequency bands; automatic gain control amplifying means coupled to said adding means for amplifying the pulse passed thereby; first band-pass filter means coupled to said amplifying means and arranged to pass a pulse having said first frequency band; second band-pass filter means coupled to said amplifying means and arranged to pass a pulse having said different frequency band; means coupled to said second band-pass means for demodulating the pulse passed thereby to said first frequency band; and means coupled to said first band-pass filter means and to said last-named converting means for differentially combining the pulses passed thereby.

5. A radio direction finding system for determining the location of a source of pulsed radio signals comprising: first and second input circuits adapted respectively to be connected to two antennas for respectively receiving a pulsed radio signal from a distant source; first and second detectors respectively connected to said first and second input circuits for providing first and second detected pulses having a first frequency band; a first signal mixer having its signal input circuit connected to said first detector and having its carrier input circuit connected to a first carrier generating local oscillator whereby said carrier is modulated by said first input pulse, said first signal mixer being arranged to pass one only of the side band frequencies of its output signal; an adding circuit connected to the output circuit of said first signal mixer and to said second detector; an amplifier having its input circuit connected to said adding circuit; a first band-pass filter connected to the output circuit of said amplifier and arranged to pass only said first frequency band; a second band-pass filter connected to said amplifier output circuit and arranged to pass only said side band frequencies; a second signal mixer having its signal input circuit connected to said second band-pass filter and having its carrier input circuit connected to said first local oscillator whereby the pulses passed by said second band-pass filter are demodulated, said second signal mixer being arranged to pass only one side band of its output signal, the side band passed by said second signal mixer being the opposite side band with respect to the side band passed by said first signal mixer; and a differential amplifier having two input circuits connected respectively to said first band-pass filter and the output circuit of said second signal mixer, said differential amplifier having its output circuit adapted to be connected to the deflection means of oscilloscope means.

References Cited in the file of this patent

UNITED STATES PATENTS

| | | |
|---|---|---|
| 2,216,708 | Kolster | Oct. 1, 1940 |
| 2,736,019 | Vogeley et al. | Feb. 21, 1956 |
| 2,931,032 | Newhouse | Mar. 29, 1960 |